(12) United States Patent
Connolly et al.

(10) Patent No.: US 9,262,450 B1
(45) Date of Patent: Feb. 16, 2016

(54) USING DISTINGUISHED NAMES AND RELATIVE DISTINGUISHED NAMES FOR MERGING DATA IN AN XML SCHEMA

(71) Applicant: EMC Corporation, Hopkinton, MA (US)

(72) Inventors: John Connolly, Cork (IE); Karen Murphy, Cork (IE); Fearghal O'Maolcatha, Cork (IE); Benjamin David, Cork (IE); Aidan D. Moriarty, Cork (IE)

(73) Assignee: EMC Corporation, Hopkinton, MA (US)

( * ) Notice: Subject to any disclaimer, the term of this patent is extended or adjusted under 35 U.S.C. 154(b) by 219 days.

(21) Appl. No.: 14/039,956

(22) Filed: Sep. 27, 2013

(51) Int. Cl.
*G06F 7/00* (2006.01)
*G06F 17/30* (2006.01)

(52) U.S. Cl.
CPC .... *G06F 17/30292* (2013.01); *G06F 17/30286* (2013.01); *G06F 17/30823* (2013.01); *G06F 17/30985* (2013.01)

(58) Field of Classification Search
None
See application file for complete search history.

(56) References Cited

U.S. PATENT DOCUMENTS

| | | | |
|---|---|---|---|
| 7,315,860 B1* | 1/2008 | Harvey | |
| 8,898,542 B2* | 11/2014 | Leggette et al. | 714/763 |
| 2004/0078391 A1* | 4/2004 | Excoffier et al. | 707/104.1 |
| 2005/0021661 A1* | 1/2005 | Duloutre et al. | 709/217 |
| 2014/0156711 A1* | 6/2014 | Sharan et al. | 707/804 |

* cited by examiner

*Primary Examiner* — Uyen Le
(74) *Attorney, Agent, or Firm* — Ryan, Mason & Lewis, LLP

(57) ABSTRACT

Raw data is uploaded to a workspace, and an asset is determined from the raw data. The asset from the raw data is compared with an existing asset in the workspace to determine if the asset from the raw data already exists in the workspace. The comparing includes comparing a first distinguished name of the asset from the raw data with a second distinguished name of the existing asset to determine if the first and second distinguished names are the same.

20 Claims, 5 Drawing Sheets

600

USING DISTINGUISHED NAMES AND RELATIVE DISTINGUISHED NAMES FOR MERGING DATA IN AN XML SCHEMA

FIELD

The field relates generally to data storage and processing systems, and more particularly to techniques for using distinguished names and relative distinguished names for merging data in an Extensible Markup Language (XML) schema.

BACKGROUND

Typically, there is a requirement to merge asset information into a workspace data center model (DCM) for assets that already exist in the workspace. For example, a user may upload raw data to their workspace. The raw data can be parsed and a list of model assets generated, whereby each model asset represents a top level asset found in the raw data. During a correlation process, as each model asset is persisted, a check is made to see if the model asset already exists in the workspace. If the model asset does not exist, it is created. If the model asset already exists, the latest model asset XML is merged into the existing copy.

The initial implementation of a merge is generally a destructive merge, which adds sub-assets from incoming top level assets that do not already exist, merges the properties of those sub-assets that already exist, and removes sub-assets that are not in the incoming top level assets.

In order to perform a merge, a method of clearly identifying an asset and its sub-assets in order to compare assets with each other is required. In known approaches, the code to compare one asset with another is embedded in the source code making the comparison. As a result, code to compare two objects for likeness or similarities is scattered across applications, making the code difficult to maintain. In some cases, in known systems, the code to compare the same assets is duplicated and/or inconsistent.

Accordingly, a need exists for improved systems and methods for identification and comparison of assets when merging data.

SUMMARY

Embodiments of the invention provide techniques for using distinguished names and relative distinguished names for merging and processing data. In accordance with embodiments of the present invention, assets and their sub-assets are discernible or differentiated by an identifier or natural key, such as a Distinguished Name (DN) by which the asset or sub-asset can be identified.

For example, in one embodiment, a method comprises the following steps. Raw data is uploaded to a workspace, and an asset is determined from the raw data. The asset from the raw data is compared with an existing asset in the workspace to determine if the asset from the raw data already exists in the workspace. The comparing comprises comparing a first distinguished name of the asset from the raw data with a second distinguished name of the existing asset to determine if the first and second distinguished names are the same. The uploading, determining and comparing steps are executed via at least one processor coupled to a memory.

In another embodiment, an article of manufacture is provided which comprises a processor-readable storage medium having encoded therein executable code of one or more software programs. The one or more software programs when executed by a processor device implement steps of the above-described method.

In yet another embodiment, an apparatus comprises a memory and a processor operatively coupled to the memory and configured to perform steps of the above-described method.

Advantageously, the embodiments of the present invention permit the definition of the properties that define an asset's uniqueness for the purposes of comparison to be in one location which maintains consistency across all applications using a distinguished name (DN) service, and the DN service can be configured to map to any model. In accordance with embodiments of the present invention, the Relative Distinguished Names (RDNs) are defined for the Global Services Software Development (GSSD) data center model, but it to be understood that any model can be configured to be used by the DN service. For example, if an external model defines a storage array, such as, for example, Symmetrix®Array, commercially available from EMC Corporation of Hopkinton, Mass., an embodiment of the present invention can define an RDN for that model and use the DN service to compare a DCM storage array with the external model storage array.

These and other features and advantages of the present invention will become more readily apparent from the accompanying drawings and the following detailed description.

DETAILED DESCRIPTION

Embodiments of the present invention will be described herein with reference to exemplary computing systems and data storage systems and associated servers, computers, storage units and devices and other processing devices. It is to be appreciated, however, that embodiments of the invention are not restricted to use with the particular illustrative system and device configurations shown. Moreover, the phrases "computing system" and "data storage system" as used herein are intended to be broadly construed, so as to encompass, for example, private or public cloud computing or storage systems, as well as other types of systems comprising distributed virtual infrastructure. However, a given embodiment may more generally comprise any arrangement of one or more processing devices.

As used herein, the term "cloud" refers to a collective computing infrastructure that implements a cloud computing paradigm. For example, as per the National Institute of Standards and Technology (NIST Special Publication No. 800-145), cloud computing is a model for enabling ubiquitous, convenient, on-demand network access to a shared pool of configurable computing resources (e.g., networks, servers, storage, applications, and services) that can be rapidly provisioned and released with minimal management effort or service provider interaction.

As used herein, the term "asset" or "object" refers to any data, device, or other component of an environment supporting information-related activities and/or tasks. Assets can include hardware, software and information, including, but not limited to, servers, switches, arrays (e.g., storage arrays), ports, controllers, fabrics, cards, routers, domains, configurations, applications, support systems, and confidential and non-confidential organizational information.

Figure 1:
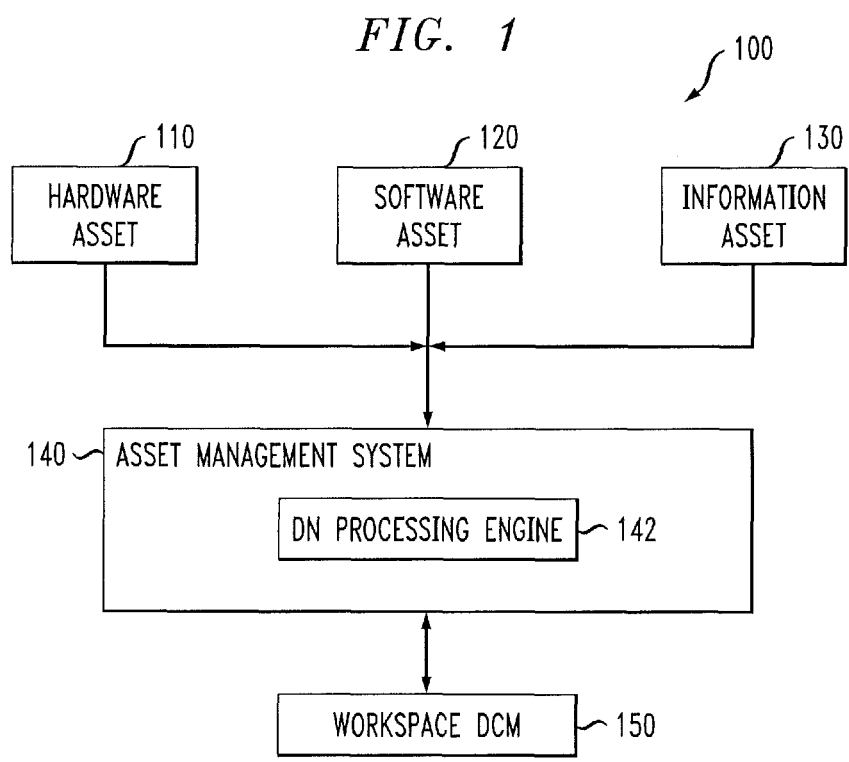
FIG. 1 shows a data storage and processing environment with an asset management system according to an embodiment of the invention.

FIG. 1 shows a data storage and processing environment with an asset management system. The data storage and processing environment 100 in FIG. 1, includes hardware, software and/or information assets 110, 120, 130 interfacing with a workspace DCM 150 through asset management system 140, which includes a Distinguished Name (DN) processing engine 142.

The DN processing engine 142 executes the DN service described further below. The DN processing engine 142 functions as an interface exposed to applications in order for the applications to get the DN and/or RDN for their assets 110, 120 and/or 130.

It is to be appreciated that while the data storage and processing environment 100 illustrates one of each of a hardware asset 110, a software asset 120 and an information asset 130, environment 100 may include a larger or smaller number of assets of each type. Also, it is to be understood that the environment may include additional execution components not expressly shown. For example, when the environment is implemented as part of a distributed virtual infrastructure, each element of the environment may have associated therewith one or more virtual machines (VMs), and/or one or more logical units (LUNs). Thus, each element can have both logical and physical execution and storage components.

Figure 2:
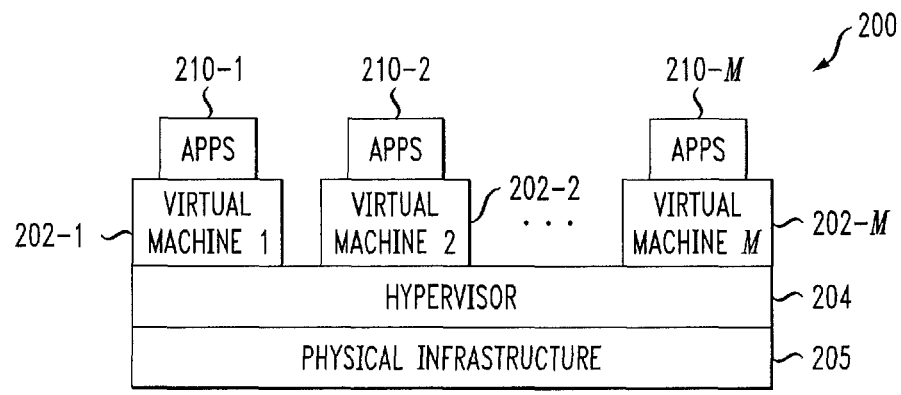
FIGS. 2 and 3 show examples of processing platforms that may be utilized to implement at least a portion of the systems of FIGS. 1 and 2.

As shown in FIG. 2, a cloud infrastructure 200 comprises virtual machines (VMs) 202-1, 202-2, . . . 202-M implemented using a hypervisor 204. The hypervisor 204 is an example of what is more generally referred to herein as "virtualization infrastructure," as mentioned above. The hypervisor 204 runs on physical infrastructure 205 (e.g., such as may include CPUs and/or storage devices). The cloud infrastructure 200 further comprises sets of applications 210-1, 210-2, . . . 210-M running on respective ones of the virtual machines 202-1, 202-2, . . . 202-M (utilizing associated logical units (LUNs)) under the control of the hypervisor 204.

Although only a single hypervisor 204 is shown in the example of FIG. 2, a given embodiment of cloud infrastructure configured in accordance with an embodiment of the invention may include multiple hypervisors, each running on its own physical infrastructure. Portions of that physical infrastructure might be virtualized.

As is known, virtual machines are logical processing elements that may be instantiated on one or more physical processing elements (e.g., servers, computers, processing devices). That is, a "virtual machine" generally refers to a software implementation of a machine (i.e., a computer) that executes programs in a manner similar to that of a physical machine Thus, different virtual machines can run different operating systems and multiple applications on the same physical computer. Virtualization is implemented by the hypervisor 204 which, as shown in FIG. 2, is directly inserted on top of the computer hardware in order to allocate hardware resources of the physical computer (physical infrastructure 205) dynamically and transparently. The hypervisor 204 affords the ability for multiple operating systems to run concurrently on a single physical computer and share hardware resources with each other. The hypervisor 204 thus also manages disk I/O scheduling associated with the workloads performed by each virtual machine.

An example of a commercially available hypervisor platform that may be used to implement portions of the cloud infrastructure 200 in one or more embodiments of the invention is the VMware® vSphere™ which may have an associated virtual infrastructure management system such as the VMware® vCenter™. The underlying physical infrastructure 205 may comprise one or more distributed processing platforms that include storage products such as VNX and Symmetrix® VMAX, both commercially available from EMC Corporation of Hopkinton, Mass. A variety of other storage products may be utilized to implement at least a portion of the cloud infrastructure 200.

Figure 3:
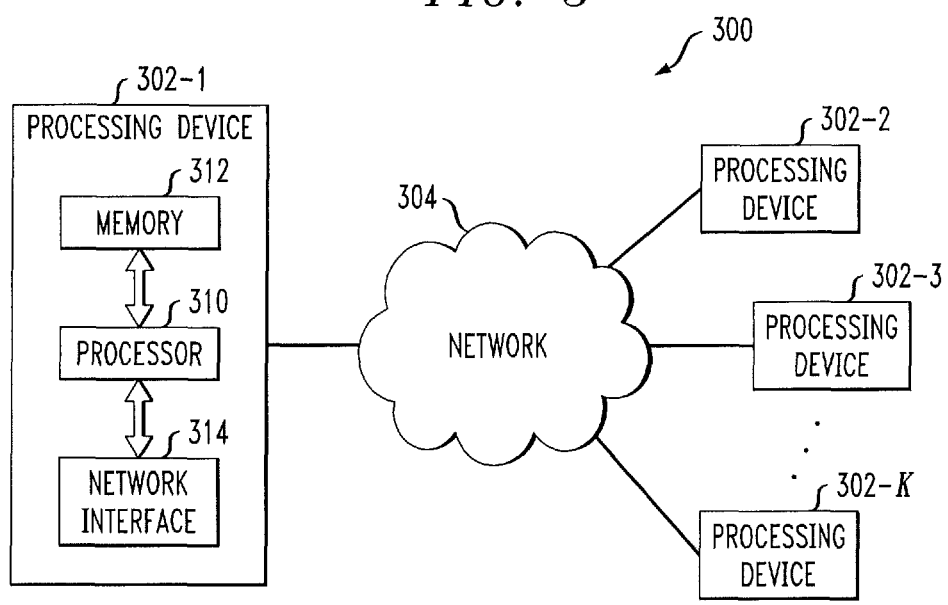

An example of a processing platform on which the cloud infrastructure 200 and/or the asset management system 140 and DN processing engine 142 of FIG. 1 may be implemented is processing platform 300 shown in FIG. 3. The processing platform 300 in this embodiment comprises at least a portion of the system 100 and includes a plurality of processing devices denoted 302-1, 302-2, 302-3, . . . 302-K, which communicate with one another over a network 304. One or more of the elements of system 100 may therefore each run on one or more computers or other processing platform elements, each of which may be viewed as an example of what is more generally referred to herein as a "processing device." As illustrated in FIG. 3, such a device generally comprises at least one processor 310 and an associated memory 312, and implements one or more functional modules for controlling certain features of system 100. Again, multiple elements or modules may be implemented by a single processing device in a given embodiment.

The processing device 302-1 in the processing platform 300 comprises a processor 310 coupled to a memory 312. The processor 310 may comprise a microprocessor, a microcontroller, an application-specific integrated circuit (ASIC), a field programmable gate array (FPGA) or other type of processing circuitry, as well as portions or combinations of such circuitry elements. Components of a computing system as disclosed herein can be implemented at least in part in the form of one or more software programs stored in memory and executed by a processor of a processing device such as processor 310. Memory 312 (or other storage device) having such program code embodied therein is an example of what is more generally referred to herein as a processor-readable storage medium. Articles of manufacture comprising such processor-readable storage media are considered embodiments of the invention. A given such article of manufacture may comprise, for example, a storage device such as a storage disk, a storage array or an integrated circuit containing memory. The term "article of manufacture" as used herein should be understood to exclude transitory, propagating signals.

Furthermore, memory 312 may comprise electronic memory such as random access memory (RAM), read-only memory (ROM) or other types of memory, in any combination. The one or more software programs when executed by a processing device such as the processing device 302-1 causes the device to perform functions associated with one or more of the elements/components of system environment 100. One skilled in the art would be readily able to implement such software given the teachings provided herein. Other examples of processor-readable storage media embodying embodiments of the invention may include, for example, optical or magnetic disks.

Also included in the processing device 302-1 is network interface circuitry 314, which is used to interface the server with the network 304 and other system components. Such circuitry may comprise conventional transceivers of a type well known in the art.

The other processing devices 302 of the processing platform 300 are assumed to be configured in a manner similar to that shown for processing device 302-1 in the figure.

The processing platform 300 shown in FIG. 3 may comprise additional known components such as batch processing systems, parallel processing systems, physical machines, virtual machines, virtual switches, storage volumes, logical units, etc. Again, the particular processing platform shown in FIG. 3 is presented by way of example only, and system 100 of FIG. 1 may include additional or alternative processing platforms, as well as numerous distinct processing platforms in any combination.

Also, numerous other arrangements of servers, computers, storage devices or other components are possible in system 100. Such components can communicate with other elements of the system 100 over any type of network, such as a wide area network (WAN), a local area network (LAN), a satellite network, a telephone or cable network, a storage network (e.g., FC), a converged network (e.g., FCoE or Infiniband) or various portions or combinations of these and other types of networks.

Embodiments of the present invention generate a DN for an asset that conforms to a standard that can be used across all GSSD applications in order to facilitate a correlation process in the GS cloud, and also the import and export of information between differing data sets.

As used herein, the term "Distinguished Name" (DN) refers to an identifier that uniquely identifies objects (e.g., assets), and includes attribute=value pairs separated by commas. The identification can be from a business domain perspective. In accordance with an embodiment of the present invention, a DN is a combination of one or more Relative Distinguished Names (RDNs) and parent DNs. The RDN is constructed from attributes of the object. The format for the RDN may be the attribute=value pair described above (e.g., type=<object type>,attrName=<attrValue>).

For example, a Symmetrix® masking view can be uniquely identified by its name within the context of a Symmetrix® Array. As used herein, the term "masking view" refers to an association of a group of devices, for example, a storage group in a storage area network (SAN) disk array (e.g, CLARiiON® of EMC Corporation of Hopkinton, Mass.), a front-end port group and a host initiators group with each other. In other words, a masking view is a view of the co-relation between storage group, port group and initiator group. Other masking views may exist with the same name within different arrays, but each one is unique to the array to which it belongs. In order to be able to identify a particular masking view, embodiments of the present invention identify the object by its DN.

By way of example, a masking view called MyMaskingView may exist in an Array '123456789' and also exist in Array '987654321'. In accordance with an embodiment of the present invention, the DN and RDN identifiers are constructed as follows:

RDN:
Array 123456789: type=SymmetrixArray,serialNo=123456789
Array 987654321: type=SymmetrixArray,serialNo=987654321
Masking View MyMaskingView: type=SymmetrixMaskingView,name=MyMaskingView DN:
Masking View on array 123456789: type=SymmetrixMaskingView,name=MyMaskingView, type=SymmetrixArray,serialNo=123456789.

Embodiments of the present invention incorporating the RDN and DN scheme identified herein allow for an asset having multiple parents, and also describe how to handle assets where an RDN cannot be defined for an asset. Embodiments of the present invention facilitate correlation when a top level asset is re-imported and there is a requirement to merge the newly imported assets with existing assets that are already persisted.

As used herein, "Distinguished Name (DN) Service", refers to a service that can return the DN of an object. The DN service is run on the asset management system 140, more particularly, the DN processing engine 142, and is the interface exposed to applications in order for the applications to get the DN and/or RDN for their objects. As described below in connection with FIG. 4 and Table 1, in accordance with an embodiment of the present invention, a DN processing engine 410 is able to perform the DN service including, but not limited to, getRDN, getDN, sameRDN, PartiallyDerivedRDN and getParentClassNames processes. A getRDN process includes passing a selected object and returning a string that represents the RDN. The service will load the object to type and attribute mappings from its configuration. A command string for retrieving the RDN of an object will specify a selected object/asset. A getDN process includes passing a selected object and a map of its parents to determine a distinguished name of the object. A command string for retrieving the DN of an object will specify a selected object/asset, and include a command to map the object's parents. A getParentClassNames process includes obtaining parent class names for an asset. A command string for retrieving the parent class names of an object will specify a selected object/asset.

Embodiments of the present invention provide methods for comparing the DNs and RDNs of two or more objects. For example, a sameRDN process includes passing two or more selected objects to compare the objects to each other, and returning a "true" indication if the RDN is the same for each (e.g., the same for both objects if two objects are compared). A command string for comparing the RDN of two or more objects will specify the selected object/assets to compare. In accordance with an embodiment of the present invention, merge code interrogates an incoming DCM asset and sets the simple properties on an existing DCM asset. When a sub-asset is reached, processing requires passing the sub-asset from the incoming DCM and existing DCM to the sameRDN method, which would return "true" if the objects were the same. If the objects are the same, the sub-assets are merged. Otherwise, if not the same, the existing sub-asset is replaced with the new sub-asset.

A PartiallyDerivedRDN process returns a Boolean (true/false) result if the element passed has only a partially derived RDN. The result indicates whether a generated RDN for the element is derived from a full set of possible keys or only a partial set where remaining information is not available. The PartiallyDerivedRDN process is used to help the correlation service decide to what degree two assets are equal.

Table 1 describes an interface for the DN Service, according to an embodiment of the present invention.

TABLE 1

| Method | Description | Parameters |
| --- | --- | --- |
| getRDN | Returns the relative distinguished name for the object passed. If it cannot be determined because there is no descriptor found for the class, it will return null | Object asset |
| getDN | Returns the distinguished name for the object and the objects parent hierarchy passed. If it cannot be determined because there is no descriptor found for the class, it will return null | Object asset, List<Object> parentHierarchy |
| sameRDN | Returns true if the relative distinguished names for the two objects passed is the same | |
| PartiallyDerivedRDN | Returns a Boolean (true/false) result if the element passed has only a partially derived RDN | |
| getParentClassNames | Returns the parent class names for an asset | |

Figure 4:
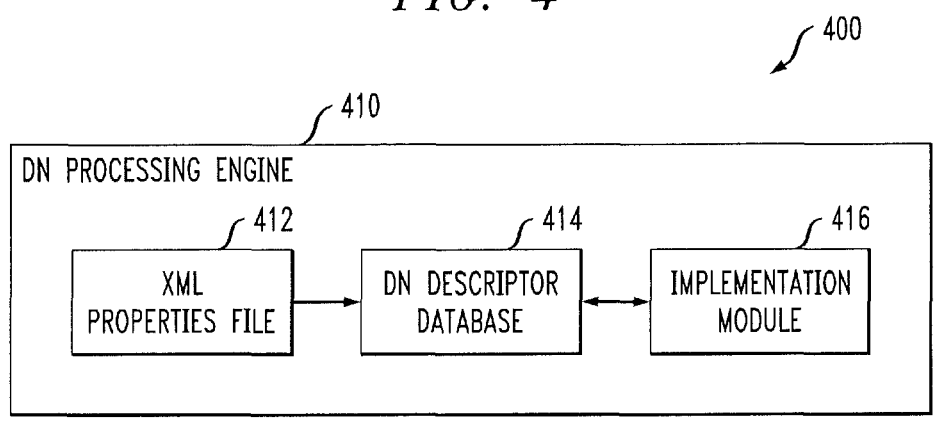
FIG. 4 shows an asset management system according to an embodiment of the invention.

FIG. 4 shows an asset management system 400 according to an embodiment of the invention. The system 400 includes a DN processing engine 410.

The DN processing engine 410 includes an XML properties file 412 (e.g., a spring based XML properties file), in which DN descriptors for each asset or object are defined. In accordance with an embodiment, the file 412 is an XML-based configuration file based on Spring beans schema. The DN processing engine 410 further includes a DN descriptor database 414, which includes the DN descriptors from the file 412. A DN descriptor defines how a DN is generated for an object or asset. For example, for each object or asset, information in the DN descriptor database 414 may include: (1) a description of the type of object or asset (e.g., Host, Array, Array Device, etc.); (2) those entities that the subject asset or object extends; (3) one or more parents of the subject asset or object (e.g., an array can be a parent to an array device, or "Symmetrix®" may be a parent to "Symmetrix® Masking View"); (4) identifying attributes of the subject object or asset (e.g., Key: the name of a method to invoke on the object, and/or Value: the value to give to the attribute in the DN, such as, type="Host", hostName="<value returned by getName( ) on Host object>"); and (5) any additional information/comments for the subject asset or object. For example, in the case of an "Array" as the subject asset, it can be classified as a top level asset that does not extend another element, and has no parent. As referenced above, its identifying attribute can be a serial number. In the case of an Array Adapter, it can be classified as extending an adapter, can have parents including, for example, an array and array controller, and may have the same identifying attributes as its adapter parent.

According to an embodiment, in an example of a host, the type is defined as "Host", and the Host's name attribute is used to define its RDN, and the distinguished name can be defined as type="Host", hostName="<value returned by getName( ) on Host object>".

If an asset does not have a natural key or a set of attributes that could be used to define a DN for that asset, then a static entry may be provided. This can be indicated by setting "#static" in the Key and the static value to return for the DN in the value (e.g., <entry key="#static" value="someValue"/> would return static="someValue".

By way of example, where the class name is being used as the static value, the following may result, <entry key="#static" value="#className"/>. This would automatically populate the class name as the value of the #static key. In accordance with an embodiment, this approach is applied to entities that have only one entry per parent.

There are cases where an asset can have more than one parent. An example is a SwitchPort, which can be contained within a fabric and a switch. A distinguished name descriptor in accordance with an embodiment of the present invention supports the case of more than one parent by allowing an asset to be defined by more than one parent. For example, the RDN for a SwitchPort is the same within a fabric or switch, but its DN depends on whether it is being referenced in terms of the context of the fabric or the switch.

Abstract assets or entities do not have an RDN declaration. The RDN is defined through the implementing class.

The DN processing engine 410 further includes an implementation module 416, which performs the DN service including, but not limited to, getRDN, getDN, sameRDN, PartiallyDerivedRDN and getParentClassNames processes. For example, the implementation module 416 can perform a correlation process, wherein one or more sources of data describing the topology of a site are parsed into a DCM and are merged with existing DCM data in a workspace.

Figure 5:
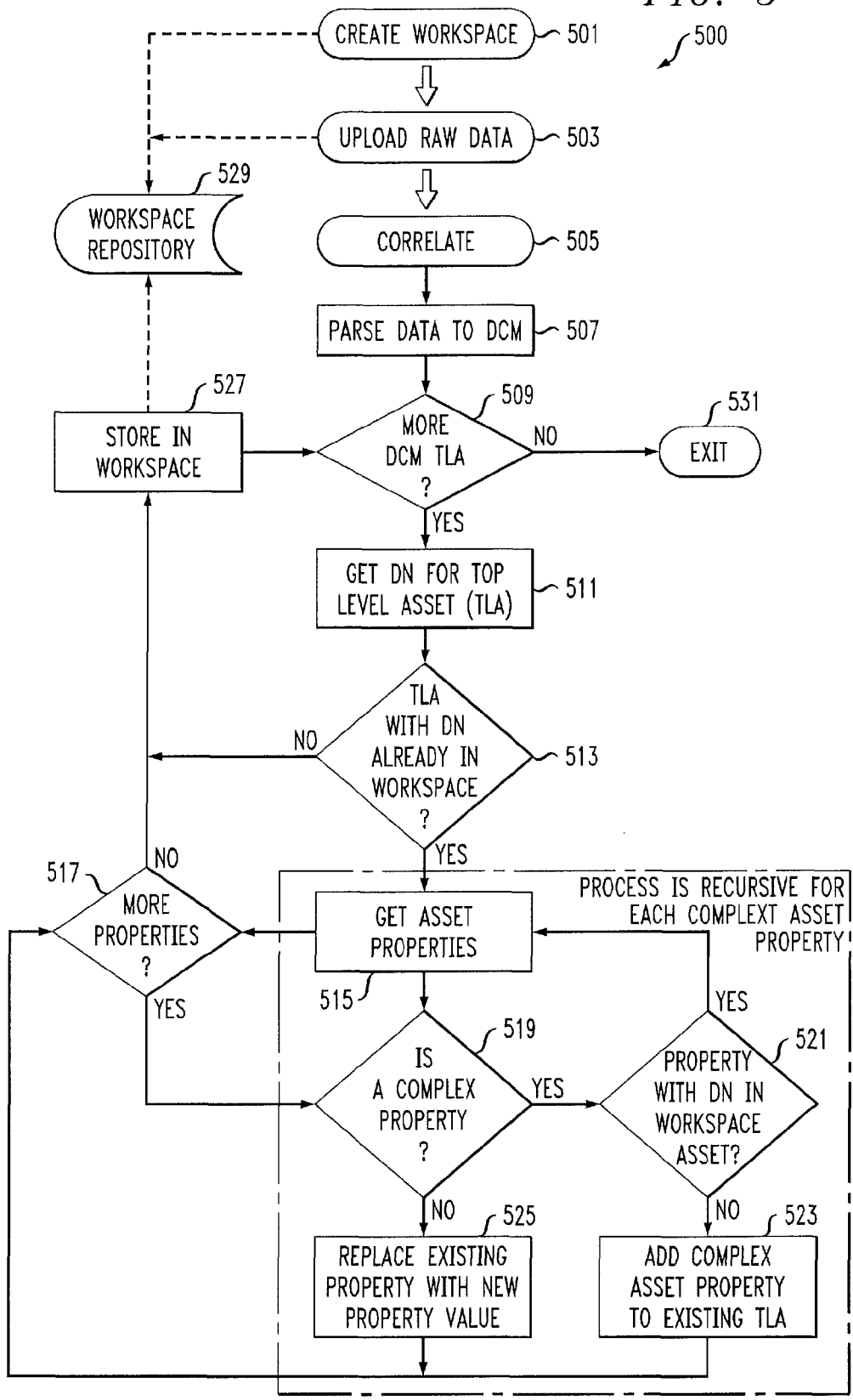
FIG. 5 is a flow diagram showing a method for asset management according to an embodiment of the invention.

By way of example, referring to FIG. 5, which is a flow diagram showing a method 500 for asset management according to an embodiment of the invention, a user can create a workspace (block 501) and upload raw data (e.g., import a grab) that contains host information and some information about the arrays connected to that host (block 503). The correlation process (block 505) parses the grab file into DCM XML (block 507), which contains a description of the host and the arrays and stores it in the workspace. The grab contains limited detail about the array such as, for example, its model, type, microcode version, etc. A user can then import a db file, and run the correlation again. In a non-limiting example, the array can be a Symmetrix® array, and the db file can be a SymApi DB file commercially available from EMC Corporation of Hopkinton, Mass.

The correlation process parses the db file into DCM XML and then merges it with the existing array in the workspace. The merge process compares two objects of the same type and based on their DNs, the system knows whether it is dealing with the same object. If it is, the system will set the properties of an existing object with those of the incoming object. If the object does not exist, the system adds it. This is an iterative process. More specifically, at block 509, it is queried whether there are any top level assets (TLAs) in the data. If no at block 509, then the process exits at block 531. If yes at block 509, then at block 511, the DN for a TLA is retrieved, and it is queried whether the TLA with the DN is already in the workspace (block 513). If it is not already in the workspace, the TLA is stored in the workspace (block 527) in a workspace repository (block 529). In accordance with an embodiment, the service performing the correlation (e.g., the DN service) can be passed a stream of DCM XML that can contain one or more TLAs, and the repository 529 stores each TLA in its own file.

If it is already in the workspace, the properties of the TLA are retrieved (block 515) and its queried whether the properties are complex (block 519). If the properties are not complex, existing properties are replaced with the new property values (block 525). If the properties are complex, it is queried whether the complex properties with the DN are in the workspace asset (block 521). Comparing sub-assets is represented in block 521. The comparison to check sub-assets is a recursive loop through the sub-assets of the TLA to see whether to add or replace the sub-assets. If yes at block 521, then the process continues to block 517 to determine if there are more asset properties. If no at block 521, the complex asset properties are added to the existing TLA at block 523. As used herein, a "property" can refer to a simple property of an element that is a leaf node, i.e., it has no child properties and is typically, for example, text, date, number, etc. A complex property can contain one or more child properties that in turn may be simple properties or complex properties.

At block 517 (which is reached after blocks 521, 523 and 525), if there are more properties to evaluate, the process returns to block 519. If there are no more properties to evaluate, the newly added complex asset properties from block 523 and the new property values from block 525 are stored in the workspace in the workspace repository 529, and the process returns to block 509 to query whether there are other TLAs in the data.

In FIG. 5, in accordance with an embodiment, the service performing the correlation (e.g., DN service) is comparing a TLA passed to the service to one with the same RDN that currently exists in the repository. As the process iterates through the sub-assets of the TLA, it can compare each sub-asset's RDN since each sub-asset belongs to the same TLA. The comparison can also be made using the full DNs since a DN is made up of the RDNs of the asset itself and its parent(s).

For example, if the TLA is a Symmetrix®Array with RDN [symarray, serialNo=123] and it contains a device with RDN [symdevice, name=dev01], the RDNs of devices can be compared if it is known that the devices belong to the same parent Symmetrix®Array. The DN of the devices, which would be, for example, [symarray,serialNo=123][symdevice, name=dev01], can also be compared.

Figure 6:
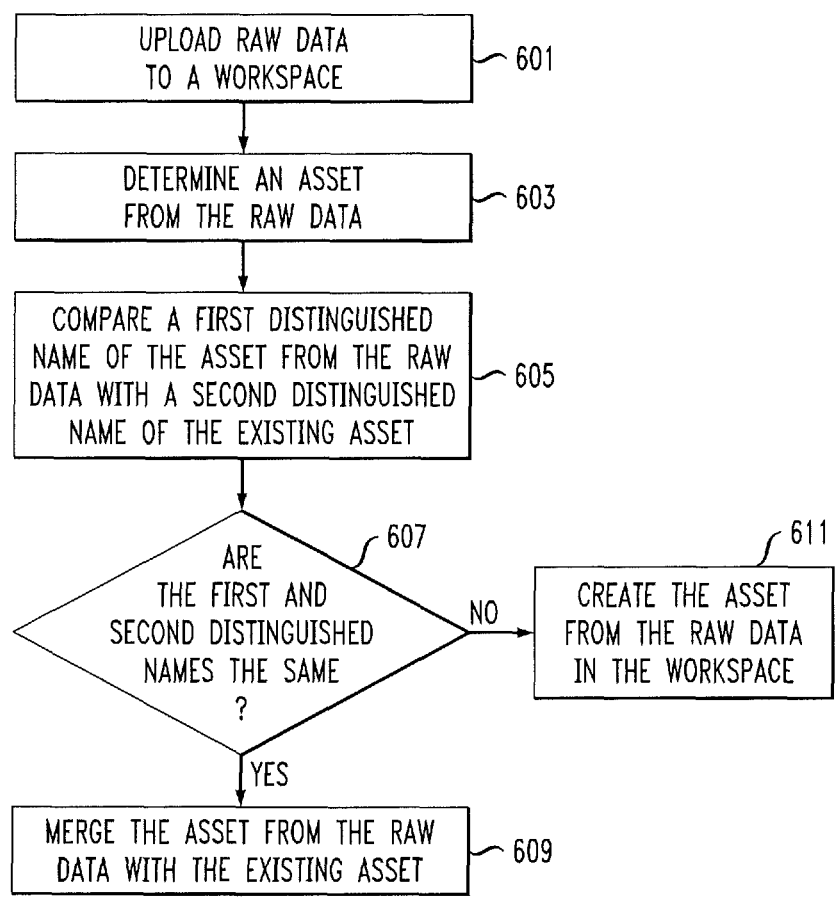
FIG. 6 is a flow diagram showing a method for asset management according to an embodiment of the invention.

Referring to FIG. 6, which is a flow diagram showing a method 600 for asset management according to an embodiment of the invention, the method includes uploading raw data to a workspace (block 601), and determining an asset from the raw data (block 603). The asset from the raw data is compared with an existing asset in the workspace to determine if the asset from the raw data already exists in the workspace. The comparing includes comparing a first distinguished name of the asset from the raw data with a second distinguished name of the existing asset (block 605) to determine if the first and second distinguished names are the same (block 607). If the first and second distinguished names are the same (Yes at block 607), the asset from the raw data is merged with the existing asset (block 609). If the first and second distinguished names are not the same (No at block 607), the asset from the raw data is created in the workspace (block 611). According to an embodiment, the first and second distinguished names include respective first and second relative distinguished names, and comparing the first and second distinguished names includes comparing the first and second relative distinguished names. The method 600 may further include retrieving a string representing the first distinguished name or the second distinguished name, and retrieving a map of one or more parents of the asset from the raw data or of the existing asset to determine the first or second distinguished name.

In accordance with an embodiment of the present invention, a DN for an asset new to the DCM is generated on the fly once received for the purposes of correlation to ensure that the DN is built from the latest values of the properties to be designated as part of the DN. When a TLA is stored in the repository, a hash representation of the RDN of each sub-asset in the TLA is stored as an assetId attribute on each sub-asset. If any subsequent update to the TLA is made, the DN and RDNs are re-calculated and stored.

Advantageously, the embodiments of the present invention permit the definition of the properties that define an asset's uniqueness for the purposes of comparison to be in one location which maintains consistency across all applications using a distinguished name (DN) service, and the DN service can be configured to map to any model. Embodiments of the present invention facilitate correlation when a top level asset is re-imported and there is a requirement to merge the newly imported assets with existing assets that are already persisted.

It should again be emphasized that the above-described embodiments of the invention are presented for purposes of illustration only. Many variations may be made in the particular arrangements shown. For example, although described in the context of particular system and device configurations, the techniques are applicable to a wide variety of other types of information processing systems, computing systems, data storage systems, processing devices and distributed virtual infrastructure arrangements. In addition, any simplifying assumptions made above in the course of describing the illustrative embodiments should also be viewed as exemplary rather than as requirements or limitations of the invention. Numerous other alternative embodiments within the scope of the appended claims will be readily apparent to those skilled in the art.

What is claimed is:

1. A method comprising:
uploading raw data to a workspace;
determining an asset from the raw data;
extracting a description of the asset from the raw data;
generating a first distinguished name of the asset from the raw data based on the extracted description;
comparing the asset from the raw data with an existing asset in the workspace to determine if the asset from the raw data already exists in the workspace, wherein the comparing comprises comparing the first distinguished name of the asset from the raw data with a second distinguished name of the existing asset to determine if the first and second distinguished names are the same; and
determining whether to create the asset from the raw data in the workspace or to merge the asset from the raw data with the existing asset in the workspace based on a result of the comparing of the first distinguished name with the second distinguished name;
wherein the uploading, first determining, extracting, generating, comparing and second determining steps are executed via at least one processor coupled to a memory.

2. The method according to claim 1, further comprising merging the asset from the raw data with the existing asset if the first and second distinguished names are the same.

3. The method according to claim 1, further comprising creating the asset from the raw data in the workspace if the first and second distinguished names are different.

4. The method according to claim 1, wherein the first and second distinguished names comprise respective first and second relative distinguished names, and comparing the first and second distinguished names comprises comparing the first and second relative distinguished names.

5. The method according to claim 1, further comprising retrieving a string representing the first distinguished name or the second distinguished name.

6. The method according to claim 1, further comprising retrieving a map of one or more parents of the asset from the raw data or of the existing asset to determine the first or second distinguished name.

7. The method according to claim 1, further comprising determining whether the asset from the raw data is a top level asset.

8. The method according to claim 7, further comprising:
   determining that the top level asset already exists in the workspace;
   retrieving a property of the top level asset; and
   determining whether the property is complex.

9. The method according to claim 8, wherein if the property is complex, the method further comprising determining whether a complex property with the first distinguished name is in the existing asset.

10. The method according to claim 8, wherein if the property is not complex, the method further comprising replacing a property of the existing asset with the property of the top level asset.

11. An article of manufacture comprising a processor-readable storage medium having encoded therein executable code of one or more software programs, wherein the one or more software programs when executed by a processor device implement the steps of:
   uploading raw data to a workspace;
   determining an asset from the raw data;
   extracting a description of the asset from the raw data;
   generating a first distinguished name of the asset from the raw data based on the extracted description;
   comparing the asset from the raw data with an existing asset in the workspace to determine if the asset from the raw data already exists in the workspace, wherein the comparing comprises comparing the first distinguished name of the asset from the raw data with a second distinguished name of the existing asset to determine if the first and second distinguished names are the same; and
   determining whether to create the asset from the raw data in the workspace or to merge the asset from the raw data with the existing asset in the workspace based on a result of the comparing of the first distinguished name with the second distinguished name.

12. An apparatus comprising:
   a memory; and
   a processor operatively coupled to the memory and configured to:
      upload raw data to a workspace;
      determine an asset from the raw data;
      extract a description of the asset from the raw data;
      generate a first distinguished name of the asset from the raw data based on the extracted description;
      compare the asset from the raw data with an existing asset in the workspace to determine if the asset from the raw data already exists in the workspace, wherein processor is further operative to compare the first distinguished name of the asset from the raw data with a second distinguished name of the existing asset to determine if the first and second distinguished names are the same; and
      determine whether to create the asset from the raw data in the workspace or to merge the asset from the raw data with the existing asset in the workspace based on a result of the comparing of the first distinguished name with the second distinguished name.

13. The apparatus according to claim 12, wherein the processor is further operative to merge the asset from the raw data with the existing asset if the first and second distinguished names are the same.

14. The apparatus according to claim 12, wherein the processor is further operative to create the asset from the raw data in the workspace if the first and second distinguished names are different.

15. The apparatus according to claim 12, wherein the first and second distinguished names comprise respective first and second relative distinguished names, and comparing the first and second distinguished names comprises comparing the first and second relative distinguished names.

16. The apparatus according to claim 12, wherein the processor is further operative to retrieve a map of one or more parents of the asset from the raw data or of the existing asset to determine the first or second distinguished name.

17. The apparatus according to claim 12, wherein the processor is further operative to determine whether the asset from the raw data is a top level asset.

18. The apparatus according to claim 17, wherein the processor is further operative to:
   determine that the top level asset already exists in the workspace;
   retrieve a property of the top level asset; and
   determine whether the property is complex.

19. The apparatus according to claim 18, wherein if the property is complex, the processor is further operative to determine whether a complex property with the first distinguished name is in the existing asset.

20. The apparatus according to claim 18, wherein if the property is not complex, the processor is further operative to replace a property of the existing asset with the property of the top level asset.

* * * * *